Patented July 8, 1952

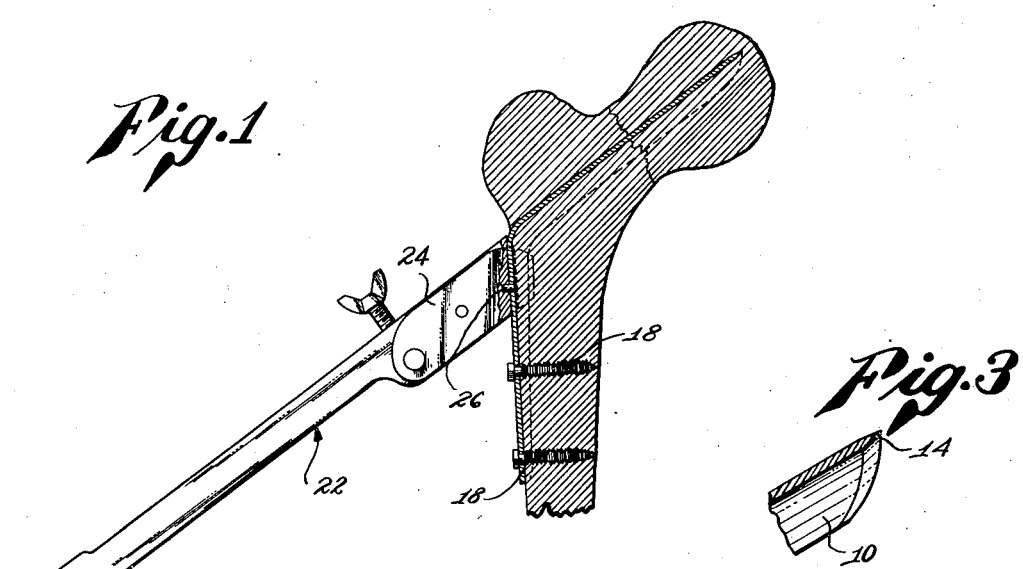
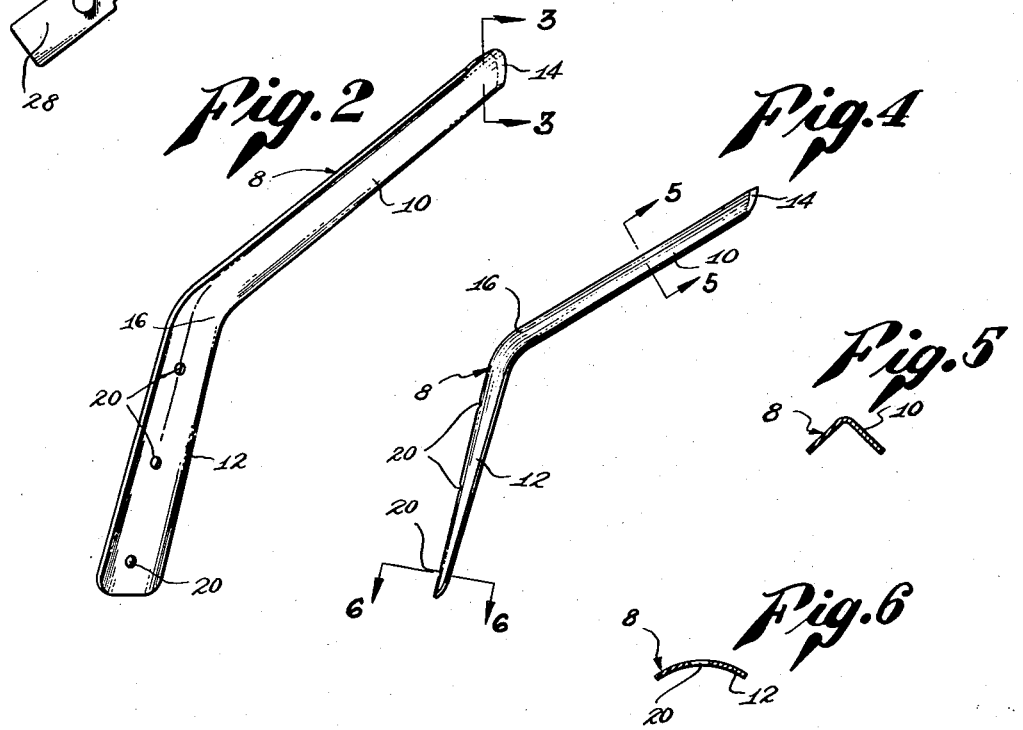

2,602,445

UNITED STATES PATENT OFFICE 2,602,445

FRACTURE NAIL

Alfred E. Gallant and Armas C. Markkula, Los Angeles, and Raymond F. Markkula, North Hollywood, Calif.

Application March 16, 1950, Serial No. 150,076

1 Claim. (Cl. 128—92)

This invention relates to a fracture nail which is particularly adaptable for repairing fractures of the neck of the femur.

It is a general object of the invention to provide a nail including a substantially straight main shank and an angular extension, the shank being adapted for driving it through the upper portion of the femoral shaft, through the neck and into the head of the femur; and the angular extension of the nail being securable to the side of the femoral shaft; wherein the nail shank and extension are strongly yet simply formed.

A more specific object is to provide a nail which is generally concavo-convex or V-shaped in cross sections, the channeled depression of the shank and extension being disposed at the same side of the nail, and the junction between the shank and extension being sufficiently strong to prevent bending or breaking of the nail when it is driven into the bone.

Another object is to provide a sheet metal nail having an extension bent relative to the longitudinal axis of the shank and wherein the bending operation produces no material stresses or points of weakness.

A further object is to provide a nail in a form which can be conveniently gripped by an inserting or driving tool.

Other objects and advantages will become apparent from the following description, in connection with the accompanying drawing wherein:

Fig. 1 is a vertical sectional view through the upper portion of a femur and the anchored nail, an inserting tool being shown mainly in side elevation;

Fig. 2 is a perspective view of the nail;

Fig. 3 is an enlarged fragmentary section taken approximately at the line 3—3 of Fig. 2;

Fig. 4 is a side elevational view;

Fig. 5 is a section taken approximately on the line 5—5 of Fig. 4; and

Fig. 6 is a section taken approximately on the line 6—6 of Fig. 4.

The nail 8 is preferably made of a non-corrosive material such as stainless steel in accordance with specifications usually set forth for implements of this general type. It comprises a shank 10 and an obliquely angled extension 12.

As best shown in Figs. 2 and 5, the shank 10 should be generally concavo-convex, and more specifically, we prefer that it be substantially V-shaped in cross section. It has a tapered and sharpened point 14, the edge of which is strong enough to resist breakage or bending when driven into the bone.

The angular extension 12 is of about the same cross sectional shape as the shank 10 adjacent the bend 16. However, the extension becomes more arcuate in cross section as it approaches its midpoint and lower end and, as shown in the drawing, the transverse curvature is flatter. This permits the extension 12 to more closely fit the circumferential contour of the femur, to which it is secured by screws 18 which extend through apertures 20 at spaced points along the extension 12.

It should be noted that the concave faces of the nail shank and extension are disposed at the same side of the nail, one forming a continuation of the other. Similarly, the side edges of the shank and extension are at the same side of the nail. This structural arrangement results in a simple bend at 16 which produces a minimum of stress at the bend and the whole of the bend is strengthened by the continuous marginal flanges provided by the concave configuration. Furthermore, when driving forces are exerted from an inserting tool such as the device 22, the webs which comprise the sides of the nail shank and extension, are in direct thrust transmitting relationship.

The inserting tool 22 does not form a part of this invention and is shown merely to bring out the manner in which the nail is driven or inserted. It also illustrates the need for a nail which will not bend or break at the angle of the shank with the extension. By way of general explanation, it is seen that the tool 22 has a pair of jaws 24 which grip the upper sides of the extension 12 and a pin 26 which is received in the uppermost screw aperture 20 to hold the nail in proper position.

The nail is driven by blows on the anvil 28 at the outer end of the tool 22.

The structure disclosed herein is simple in form and can be manufactured relatively cheaply. It is so formed that it will fit snugly when inserted. Furthermore it is designed to provide maximum strength and resistance to breakage under the considerable force necessary for insertion in the bone.

It will be understood that changes can be made in the specific form, details and proportions without departing from the spirit of the invention.

We claim:

A fracture nail of the character described comprising a one-piece body having a shank portion and an extension portion at an oblique angle to the shank portion, the entire body including the juncture of said shank portion and extension portion being generally concavo-convex in cross-sectional configuration to form angular longitudinal stiffening flanges on both sides of the body, the concave faces of both said portions and said juncture being on the inside of the oblique angle with said angular stiffening flanges continuous from the outer end of one of said portions across said juncture to the outer end of the other portion whereby the stiffening flanges not only resist flexure of said body at intermediate points of said portions but also resist flexure of the two portions relative to each other.

ALFRED E. GALLANT.
    ARMAS C. MARKKULA.
    RAYMOND F. MARKKULA.

REFERENCES CITED

The following references are of record in the file of this patent:

UNITED STATES PATENTS

| Number | Name | Date |
|---|---|---|
| 2,500,993 | Mason | Mar. 21, 1950 |

OTHER REFERENCES

The Journal of Bone and Joint Surgery for January 1944, page 54.

The Journal of Bone and Joint Surgery for October 1943, advertising page 2. Copy in Scientific Library.